(12) United States Patent
Wilson et al.

(10) Patent No.: US 9,012,836 B2
(45) Date of Patent: Apr. 21, 2015

(54) NEUTRON LOGGING TOOL WITH MULTIPLE DETECTORS

(71) Applicant: Weatherford/Lamb, Inc., Houston, TX (US)

(72) Inventors: Paul Wilson, Aledo, TX (US); Richard R. Pemper, Fort Worth, TX (US); Darryl Trcka, Fort Worth, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 13/661,764

(22) Filed: Oct. 26, 2012

(65) Prior Publication Data

US 2013/0105678 A1  May 2, 2013

Related U.S. Application Data

(60) Provisional application No. 61/552,171, filed on Oct. 27, 2011.

(51) Int. Cl.
    *G01V 5/10* (2006.01)

(52) U.S. Cl.
    CPC ........................... *G01V 5/101* (2013.01)

(58) Field of Classification Search
    USPC ......................................................... 250/254
    See application file for complete search history.

(56) References Cited

U.S. PATENT DOCUMENTS

| | | | | |
|---|---|---|---|---|
| 4,415,035 A | * | 11/1983 | Medlin et al. | 166/308.1 |
| 4,549,608 A | * | 10/1985 | Stowe et al. | 166/280.1 |
| 4,780,857 A | * | 10/1988 | Lyle et al. | 367/35 |
| 5,018,578 A | * | 5/1991 | El Rabaa et al. | 166/281 |
| 5,044,462 A | * | 9/1991 | Maki, Jr. | 181/103 |
| 5,318,123 A | * | 6/1994 | Venditto et al. | 166/250.1 |
| 5,322,126 A | * | 6/1994 | Scott, III | 166/308.1 |
| 5,363,919 A | * | 11/1994 | Jennings, Jr. | 166/308.1 |
| 6,300,624 B1 | * | 10/2001 | Yoo et al. | 250/254 |
| 6,508,307 B1 | * | 1/2003 | Almaguer | 166/308.1 |
| 6,552,333 B1 | * | 4/2003 | Storm et al. | 250/269.3 |
| 6,566,649 B1 | * | 5/2003 | Mickael | 250/269.3 |
| 6,781,115 B2 | * | 8/2004 | Stoller et al. | 250/266 |
| 6,944,548 B2 | | 9/2005 | Radtke et al. | |
| 7,204,308 B2 | * | 4/2007 | Dudley et al. | 166/254.1 |
| 7,279,677 B2 | * | 10/2007 | Ellis et al. | 250/266 |

(Continued)

FOREIGN PATENT DOCUMENTS

WO   2009082551 A2   7/2009

OTHER PUBLICATIONS

Examiner's Patent Examination Report dated Feb. 22, 2013 in Australian Patent Application 2012244198.

(Continued)

*Primary Examiner* — David Porta
*Assistant Examiner* — Djura Malevic
(74) *Attorney, Agent, or Firm* — Wong, Cabello, Lutsch, Rutherford & Brucculeri, LLP (57) ABSTRACT

A neutron logging tool has multiple detectors spaced about the circumference of the tool. The detectors are shielded from each other such that each detector detects gamma rays from the area of the borehole and formation to which it is closest. The log readings from each detector can be associated with the orientation of that detector. The orientation-specific log readings can then be aggregated to form an azimuthal log which can be used to analyze pre-fractured and/or post-fractured formations.

33 Claims, 11 Drawing Sheets

(56) References Cited

U.S. PATENT DOCUMENTS

| | | | |
|---|---|---|---|
| 7,482,578 B2* | 1/2009 | Randall | 250/261 |
| 7,544,929 B1* | 6/2009 | Mickael | 250/269.5 |
| 7,681,635 B2* | 3/2010 | Farabee et al. | 166/177.5 |
| 7,766,083 B2* | 8/2010 | Willett et al. | 166/308.1 |
| 7,942,201 B2* | 5/2011 | Ekstrand et al. | 166/246 |
| 7,975,541 B2* | 7/2011 | Large et al. | 73/152.57 |
| 8,028,751 B2* | 10/2011 | Pinto et al. | 166/255.2 |
| 8,129,318 B2* | 3/2012 | McDaniel et al. | 507/271 |
| 8,365,827 B2* | 2/2013 | O'Connell et al. | 166/308.1 |
| 8,392,120 B2* | 3/2013 | McDaniel et al. | 702/11 |
| 8,664,587 B2* | 3/2014 | Evans et al. | 250/269.4 |
| 2002/0008197 A1* | 1/2002 | Mickael | 250/269.2 |
| 2002/0190198 A1* | 12/2002 | Mickael | 250/269.3 |
| 2003/0213898 A1* | 11/2003 | Storm et al. | 250/269.3 |
| 2004/0128073 A1* | 7/2004 | Radtke et al. | 702/8 |
| 2006/0131016 A1* | 6/2006 | Snoga | 166/254.2 |
| 2007/0034373 A1* | 2/2007 | McDaniel et al. | 166/250.1 |
| 2007/0040110 A1* | 2/2007 | Ellis et al. | 250/266 |
| 2008/0307875 A1* | 12/2008 | Hassan et al. | 73/152.16 |
| 2009/0210161 A1* | 8/2009 | Duenckel et al. | 702/8 |
| 2010/0193675 A1* | 8/2010 | Stoller | 250/254 |
| 2011/0029246 A1* | 2/2011 | Nikitin et al. | 702/8 |
| 2011/0238313 A1* | 9/2011 | Thornton et al. | 702/8 |

OTHER PUBLICATIONS

First Office Action in counterpart Canadian Appl. 2,793,472, dated Mar. 19, 2014.
Extended Search Report in counterpart EP Appl. 12190458.5—1559, mailed Dec. 4, 2014.

* cited by examiner

NEUTRON LOGGING TOOL WITH MULTIPLE DETECTORS

This application claims the benefit of U.S. Provisional Application No. 61/552,171, filed Oct. 27, 2011, which is incorporated herein in its entirety.

BACKGROUND

Many wells are fractured with a fracturing fluid to treat a formation and improve oil and gas production. In a standard fracturing operation, fracturing fluid is pumped down a wellbore with high pressure, causing a formation to fracture around a borehole. The fracturing fluid contains proppant (e.g. sand and/or other particles), which remains in the formation fractures and acts to "prop" open the fractures in the formation to increase hydrocarbon flow into the wellbore. Without proppant, the formation fractures may close, reducing the effectiveness of the fracturing procedure. Sometimes, other unwanted effects may occur. This may include proppant flowing back up the wellbore or an uneven distribution of proppant within the fractures in the formation. The resulting hydrocarbon production from the fractured formation may be less than optimal because of these unwanted effects. An example of a reference for hydraulic fracturing and its evaluation is described in the article "Hydraulic fracture evaluation with multiple radioactive tracers," by Pemper et al., Geophysics, Vol. 53, No. 10 (October 1998), at 1323-1333, which is incorporated herein by reference.

As a result, it would benefit an operator to know the status of the formation after fracturing. If a formation had been minimally fractured, the operator could fracture the formation again. If it could be determined that the formation was evenly fractured, and that much of the proppant was retained in the formation fractures, then the operator could continue with hydrocarbon production.

Logging tools for measuring formation properties before fracturing are known. These tools have been used in the past to log a formation to detect oil and gas formations adjacent to a wellbore. However, there has not been an ability to measure the azimuthal distribution of proppant in formation fractures.

Figure 1A:
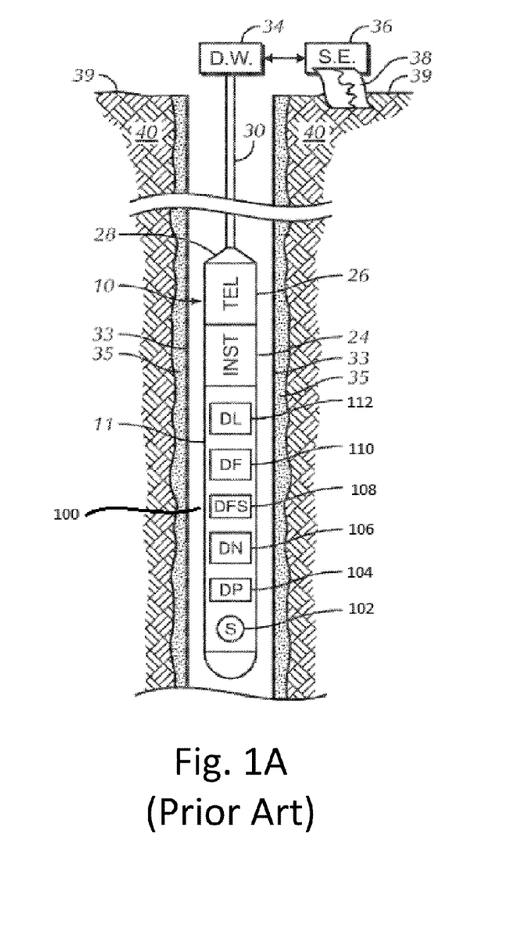
FIGS. 1A and 1B show compensated neutron tools as known in the prior art.

FIG. 1A shows a deployed exemplary neutron logging system as known in the prior art as a cased hole reservoir evaluation tool. This system is similar to the system disclosed in U.S. Pat. No. 7,999,220, which is incorporated herein by reference in its entirety. Other systems are disclosed in U.S. Pat. Nos. 5,374,823 and 6,376,838, which are also incorporated herein by reference.

For the system of FIG. 1A, neutron logging tool 10 is disposed within a borehole 33 penetrating earth formation 40. The borehole 33 may be cased with casing 35, and the casing-borehole annulus may be filled with a grouting material such as cement. Alternatively, the borehole 33 may be an uncased open hole.

Subsection 11 houses an array of detector assemblies 100 as well as a neutron generator 102. More specifically, there are four detector assemblies 100, each comprising a LaBr3 detector crystal and digital spectrometer for filtering and pulse inspection. These detectors are referred to as the proximal detector 104, the near detector 106, the far detector 110, and the long detector 112. The detectors are disposed at increasing longitudinal (or axial or vertical) distances from the neutron generator 102. Between the near detector 106 and far detector 110 is a fast neutron detector 108 that measures the fast neutron output flux and pulse shape of the neutron generator 102.

Subsection 11 is connected to instrument subsection 24. Instrument subsection 24 houses control circuits and power circuits to operate and control the elements of subsection 11. Additional elements of neutron logging tool 10 include telemetry subsection 26 and connector 28. Neutron logging tool 10 is connected by wireline logging cable 30 to above-surface elements such as draw works 34 and surface equipment 36.

Figure 1B:
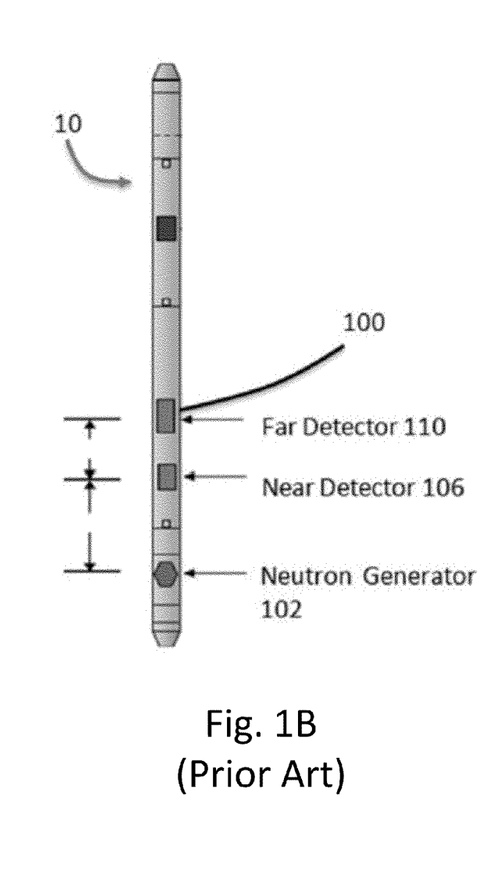

Another multi-detector neutron logging tool 10, known in the prior art as a pulsed neutron decay tool, is shown in FIG. 1B. Additional examples of different neutron logging tools 10, in addition to the cased reservoir evaluation tool (CRE) in FIG. 1A and the pulsed neutron decay tool (PND) in FIG. 1B, are the dual neutron tool (MDN), and the compensated neutron tools (CNT-S and CNT-V), all of which are available from Weatherford International Ltd.

The prior art neutron logging tools, such as tool 10 in FIGS. 1A-1B, are not able to give azimuthal logging information. Rather, the two or more detector assemblies 100 are spaced apart longitudinally along the body of the neutron logging tool 10 a short distance from the neutron source 102, and the detector assemblies 100 are vertically in line with each other along a central axis of the tool. Yet, the detector assemblies 100 make their detections of the adjacent wall of the borehole without particular regard to direction or orientation. Instead, the intention of the multiple detector assemblies 100 is to provide different formation and statistical sensitivities during logging operations.

In particular, the effect is that the detector assemblies 100 closest to the neutron generator 102 typically are more sensitive to the borehole 33, and the detector assemblies 100 further from the neutron generator 102 typically are more sensitive to the overall formation 40. The sigma ($\Sigma$) capture cross-section of the borehole 33 and formation 40 of the readings may be computed by giving different weights to the near detectors' readings as compared to the far detectors' readings. For example, in a tool with two detectors, 70% weight may be given for the near detector reading and 30% weight for the far detector reading. The neutron logging tool 10 is usually run decentralized to the wellbore with an offset spring, or decentralizer, (not shown) such that the neutron logging tool 10 effectively runs along one wall of the wellbore.

The subject matter of the present disclosure is directed to overcoming, or at least reducing the effects of, one or more of the problems set forth above.

SUMMARY

The subject matter of the present disclosure is directed to developing an azimuthal log that may be used before and/or after fracturing a formation. The azimuthal log can characterize the proppant distribution and can be compared to the pre-fracturing formation distribution. This would help an operator make decisions to optimize formation production.

A neutron logging tool has multiple detectors spaced about the circumference of the tool. The detectors are shielded from each other such that each detector detects gamma rays from the area of the borehole and formation to which it is closest. The log readings from each detector can be associated with the orientation of that detector. The orientation-specific log readings can then be aggregated to form an azimuthal log which can be used to analyze pre-fractured and/or post-fractured formations.

The foregoing summary is not intended to summarize each potential embodiment or every aspect of the present disclosure.

DETAILED DESCRIPTION

Figure 2A:
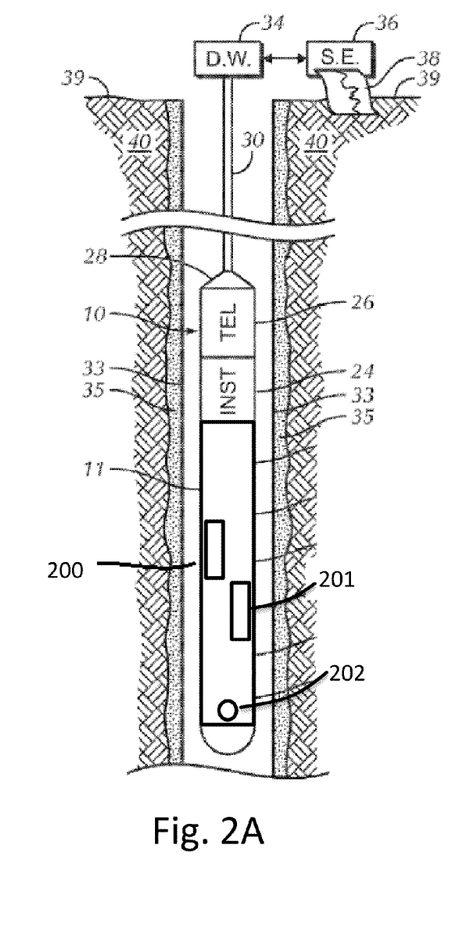
FIG. 2A shows an example logging system in accordance with the present disclosure.

FIG. 2A shows a deployed exemplary neutron logging system in accordance with the present disclosure. Neutron logging tool 200 is disposed within a borehole 33 penetrating earth formation 40. The borehole 33 may be cased with casing 35, and the casing-borehole annulus may be filled with a grouting material such as cement. Alternatively, the borehole 33 may be an uncased open hole. Neutron logging tool 200 may be run decentralized or centralized to the borehole 33, and in each circumstance, the appropriate environmental corrections would be made. Further, neutron logging tool 200 may be attached via a mechanical swivel which allows orientation of the tool independent of conveyance. Subsection 11 of neutron logging tool 200 houses gamma ray detectors (or sensors) 201a-d as well as a neutron source 202. In this example, the detectors 201a-d are disposed at increasing longitudinal distances from the neutron generator 202, although other arrangements are possible, as discussed below.

Neutron logging tools 200 and 300 have many of the same components as discussed previously, including instrument subsection 24, telemetry subsection 26, connector 28, etc. Therefore, like reference numerals are used for the similar components, and these details are not repeated here.

Figure 2B:
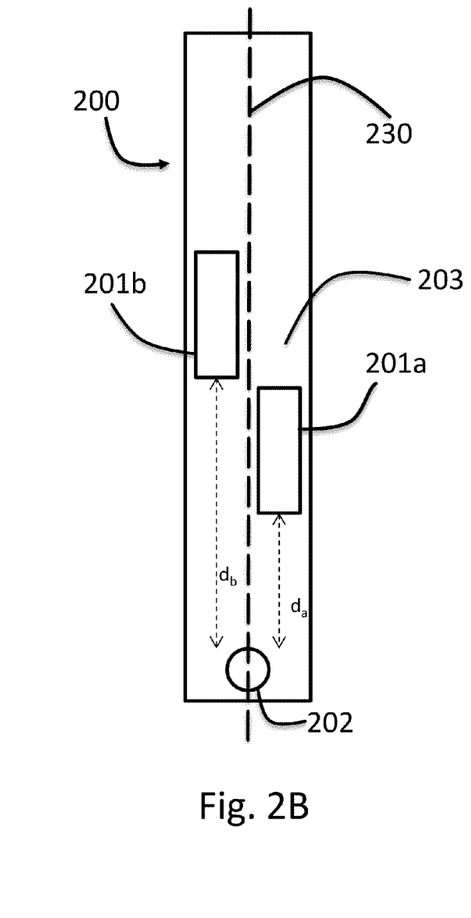
FIG. 2B shows a side view of an example neutron logging tool with multiple detectors in accordance with the present disclosure.
Figure 2C:
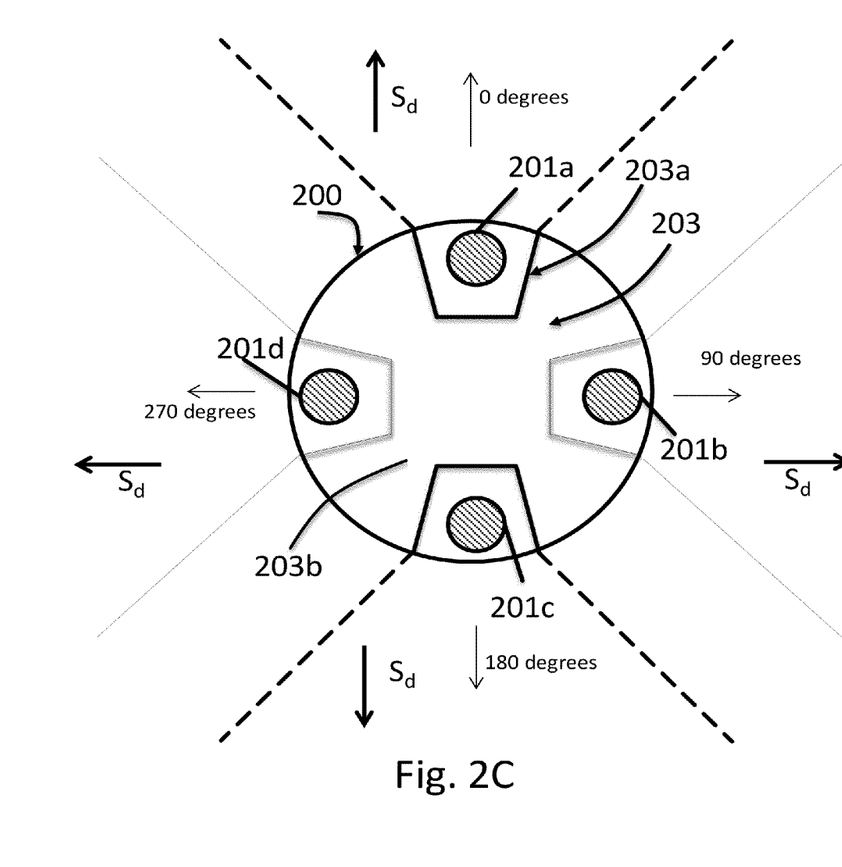
FIG. 2C shows a top-down view of an example neutron logging tool with multiple detectors in accordance to the present disclosure.

Turning instead to the tool 200, FIGS. 2B-2C show the side view and a top-down view of a portion of the exemplary neutron logging tool 200 with multiple detectors 201a-d (i.e., 201a, 201b, 201c, 201d) according to the present disclosure (although only two gamma ray detectors, 201a and 201b, are shown in FIG. 2B). At the base of the neutron logging tool 200 is neutron source 202. In general, neutron source 202, which emits neutrons, may be a pulsed neutron generator or a chemical neutron source, such as an Americium-Beryllium source. While either may be used, pulsed neutron generators are preferred because they have the benefit of being electronically controlled and cycled, and also have more energetic neutrons.

Figure 2D:
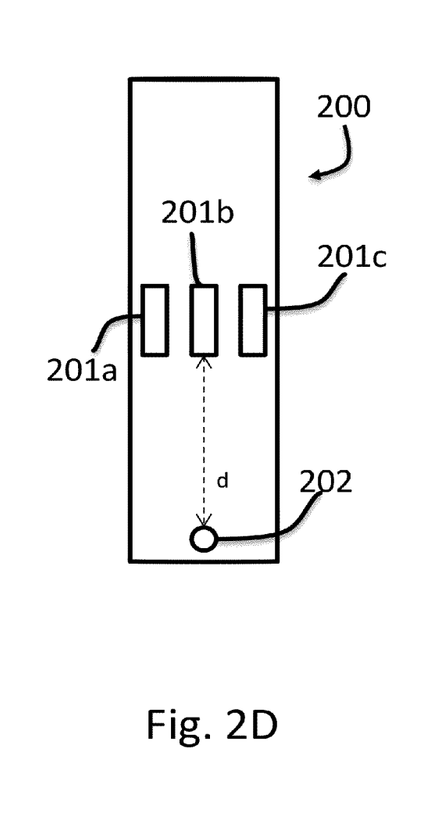
FIG. 2D shows a side view of an example logging tool with multiple detectors which are equidistant from the neutron generator in accordance with the present disclosure.

Gamma ray detectors 201a-d may be placed at different longitudinal distances (i.e., $d_a$, $d_b$, etc.) from neutron source 202 along the neutron logging tool 200, as shown in FIG. 2B. The gamma ray detectors 201a-d may not align vertically with each other, but be dispersed radially around the circumference as shown in FIG. 2C. Moreover, as seen in FIG. 2D, gamma ray detectors 201a-d (201d is not shown, as it is behind 201b) may also be placed at similar longitudinal distances (i.e., d) from neutron source 202. Further details of the possible placement of the detectors 201a-d is discussed later.

Although detectors 201a-d can be disposed at similar or different distances from the source 202, FIG. 2C shows a top-down view of the exemplary neutron logging tool 200 with multiple detectors 201a-d according to the present disclosure. While FIG. 2C shows a neutron logging tool 200 with a substantially cylindrical cross-section, the neutron logging tool 200 may have a different cross-sectional shape, such as an ellipse or other shape. However, as seen from this view in FIG. 2C, multiple gamma ray detectors 201a-d are spaced about the circumference of the neutron logging tool 200. Although four detectors 201a-d are shown in FIG. 2C, the number of detectors in the neutron logging tool 200 may be fewer or greater. Typically, the gamma ray detectors 201a-d will be spaced evenly about the circumference of the neutron logging tool 200 to image different quadrants or sections of a formation 40 or a borehole 33, but an non-uniform distribution would also perform the same function. A greater number of gamma ray detectors 201a-d would, therefore, give greater detail for an azimuthal log.

In another embodiment, shown in FIG. 2D, gamma ray detectors 201, while placed about the circumference of the neutron logging tool 200, may all be the same longitudinal distance (d) away from neutron source 202. This arrangement may be preferable because the detectors' individual responses can be directly compared with each other, and a correction for different distances does not have to be implemented. While not seen explicitly in FIG. 2D, it will be understood that each of gamma ray detectors 201a-d will be offset from the central axis (not shown) of the neutron logging tool 200. Accordingly, in the side view shown in FIG. 2D, gamma ray detector 201d (not shown) is obscured by gamma ray detector 201b. Although each tool 200 in FIGS. 2A-2D has one group of detectors 201a-d, multiple sets of detectors 201a-d may be placed along the length of the tool 200 in a manner similar to the proximal detector 104, the near detector 106, the far detector 110, and the long detector 112 of the tool 10 shown in FIG. 1A.

Figure 2E:
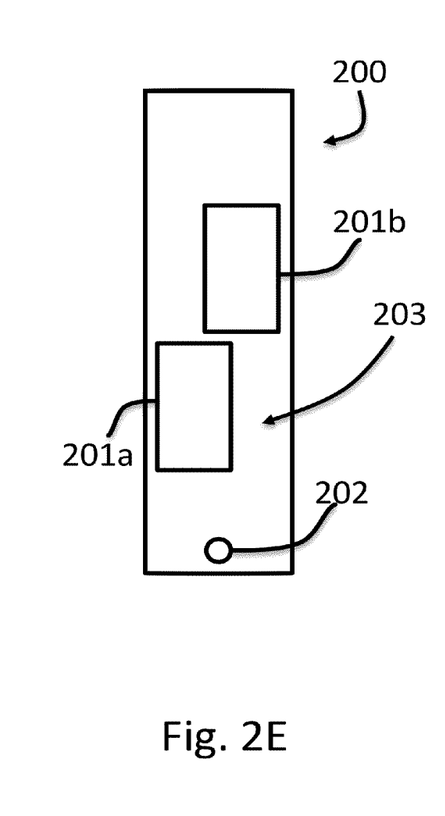
FIG. 2E shows a side view of an example logging tool with multiple detectors which radially overlap each other in accordance with the present disclosure.

As noted above, the detectors 201a-d can be arranged in a number of ways on the tool 200. If gamma ray detectors 201a-d are spaced at different longitudinal distances from the neutron source 202, as shown in FIG. 2B, they still may be placed about the circumference of neutron logging tool 200. In such a case, the gamma ray detectors 201a-d are offset from the central axis 230 of the neutron logging tool 200, although they may still intersect central axis 230 depending on the size of the detector and the overall diameter of the tool. As an example, in the neutron logging tool 200 shown in FIG. 2C, gamma ray detector 201a at the top of the neutron logging tool 200 (i.e. at 0 degrees) may be a distance $d_a$ of 10 centimeters from neutron source 202. The subsequent gamma ray detectors 201*b*, 201*c*, and 201*d*, placed at 90, 180, and 270 degrees, may be longitudinally spaced at distances of 20 ($d_b$), 30 ($d_c$), and 40 ($d_d$) centimeters from neutron source 202, respectively. Having gamma ray detectors 201*a-d* at different distances from the neutron source 202 provides the advantage of allowing for a tool with a smaller diameter. Additionally, as shown with gamma ray detectors 201*a-b* in FIG. 2E, the gamma ray detectors may be radially overlapped but longitudinally separated to reduce the diameter of the neutron logging tool 200. The disadvantage is that a correction must be made for the various distances of the detectors 201*a-d* from the source 202, although this correction can be accounted for using techniques known in the art.

As opposed to the prior art that may have multiple detectors arranged vertically in line along the length of a tool, the disclosed tool 200 with its multiple detectors 201*a-d* spaced around the tool's circumference at either the same or different vertical distances has shielding 203*b* to isolate the various detectors 201. For example, FIG. 2C shows how shielding 203*b* can fill the core 203*b* of the neutron logging tool 200 to isolate the detectors 201*a-d* circumferentially from one another. FIG. 2B shows the distances $d_a$ and $d_b$ between gamma ray detectors 201*a* and 201*b* and neutron source 202. This spacing allows for shielding 203*b* between the gamma ray detectors 201*a-d*, providing vertical isolation in addition to horizontal isolation. As an alternative or in addition, for purposes of optimizing the effectiveness of the azimuthal measurement, localized shielding 203*a* around the detectors 201*a-d* can be modified. The shielding 203*a* and/or 203*b* effectively gives each gamma ray detector 201*a-d* a sensing direction ($s_d$), as seen in FIG. 2C. The sensing direction $s_d$ and respective dotted lines in FIG. 2C show the discrete azimuthal directions from which the respective gamma ray detectors 201*a-d* detect gamma rays. The angle and arc of the azimuthal direction may be varied by varying the shielding around the gamma ray detectors 201*a-d*.

Given that the detectors 201*a-d* can be disposed at different vertical distances from the source 202, the various detectors 201*a-d* may have different sensitivities. For consistent detection, the differences in detector sensitivities must be resolved between the gamma ray detectors 201*a-d*. To do this, the gamma ray detectors 201*a-d* can be calibrated to have the same sigma ($\rho$) capture cross-sections, using techniques known in the art. Other normalization techniques could also be employed.

In some final details of the disclosed tool 200 and its detectors 201*a-d* capable of obtaining azimuthal data, it will be appreciated that the multiple gamma ray detectors 201*a-d* in the neutron logging tool 200 preferably detect gamma rays from the closest respective part of the formation. If gamma rays that passed through one side of the neutron logging tool 200 were detected by a gamma ray detector 201*a-d* on another side of the tool 200, an accurate azimuthal log would be difficult to generate. As such, it will be appreciated that it is preferred that each gamma ray detector 201*a-d* within the neutron logging tool 200 be shielded from the other detectors 201*a-d*.

As discussed previously and shown in the embodiment in FIG. 2B, the core of the neutron logging tool 200 is filled (at least partially) with a shielding material 203*b*. This shielding 203*b* absorbs gamma rays that are released from the doped proppant or from the formation. In the neutron logging tool 200 with multiple gamma ray detectors 201*a-d* as shown in the embodiment in FIG. 4A, shielding 203 that properly houses the detectors 201*a-d* can prevent gamma rays from approaching a detector 201*a-d* from a direction other than from the adjacent borehole wall toward the neutron logging tool's 200 center.

It will be appreciated that shielding 203 can alter the response of the detectors 201, which can be accounted for in a particular implementation. Shielding 203 that partially surrounds a gamma ray detector 201*a-d* may be adjusted to optimize fracture response, optimize porosity and permeability response, and/or reduce some environmental noise-inducing effects. Shielding 203 may surround a detector both vertically as well as radially (i.e., towards the center of the neutron logging tool 200). Acceptable shielding materials may include, but are not restricted to, tungsten and lead.

With each detector 201*a-d* able to read gamma rays primarily from the direction it faces, an orientation-based reading of the formation may be achieved. With a neutron logging tool 200 with multiple shielded detectors 201, each detector 201*a-d* will primarily detect gamma rays from the direction of the borehole 33 and formation 40 to which it is closest. As will be explained in further detail below, gamma rays may also be used to detect the presence of a doped proppant, such as a proppant doped with gadolinium. For example, the post-fracture log from a detector 201*a-d* in FIG. 4A facing a particular direction may display a high variance from the pre-fracture baseline log for gamma ray counts at gadolinium's characteristic energy, which originates from the gadolinium being activated from the neutron source 202. This would indicate the presence of the gadolinium-doped proppant. If the pre-fracture and post-fracture logs did not display a high variance, then it might be determined that the gadolinium-doped proppant was not present. If only one detector 201*a-d* out of multiple detectors 201*a-d* displayed a high variance, it might indicate that the doped proppant within a formation fracture was not evenly distributed about the borehole 33. Accordingly, an operator analyzing the log data could make decisions, such as deciding whether additional fracturing was necessary.

Figure 3A:
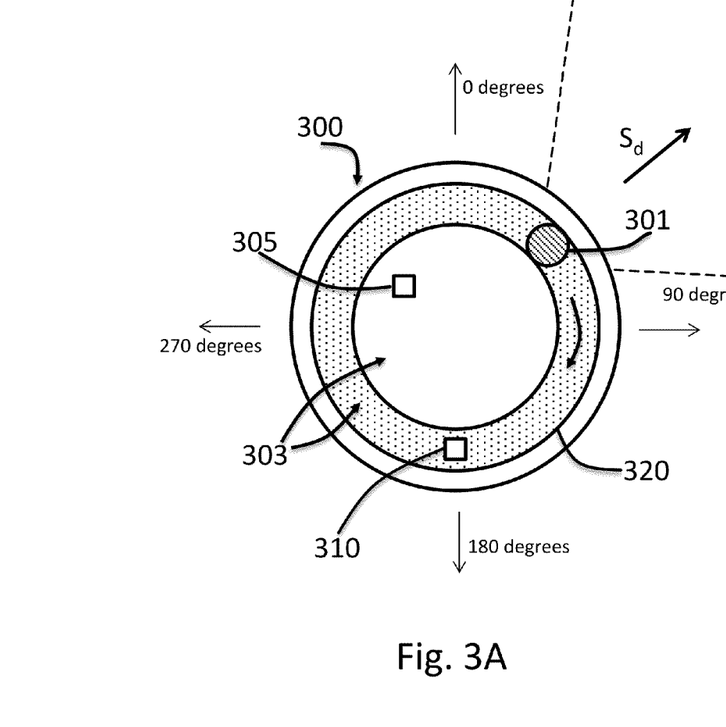
FIG. 3A shows a top-down view of another embodiment of a neutron logging tool with a detector on a rotating member.
Figure 3B:
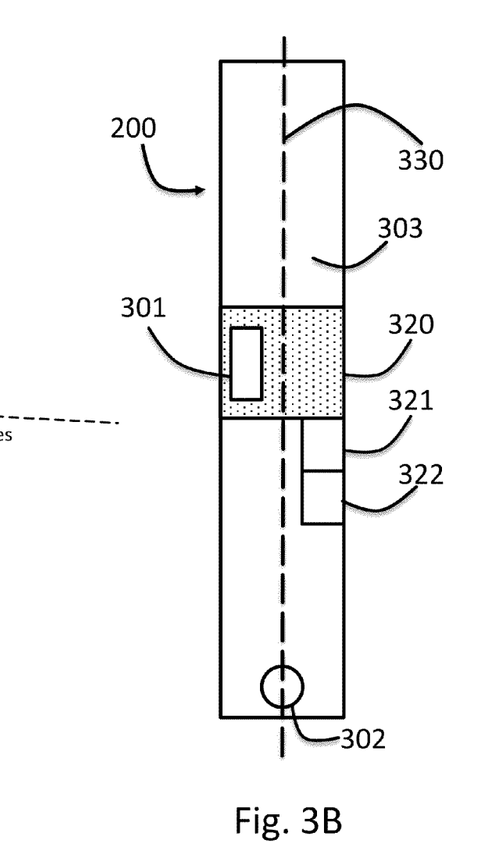
FIG. 3B shows a side view of the neutron logging tool with the detector on the rotating member.

The top down view of another embodiment of the present disclosure is shown in FIG. 3A. The neutron logging tool 300 in FIG. 3A may have only one gamma ray detector 301, which is mounted on rotating member 320, which can rotate about the vertical central axis 330 of neutron logging tool 300. In other embodiments, rotating member 320 may rotate about a different positional axis, such that the positional axis may be offset but substantially parallel to the central axis of the neutron logging tool 300. In other respects, neutron logging tool 300 may be similar to the neutron logging tool 200 shown in other figures. For example, neutron logging tool 300 has a neutron source 302 and shielding 303, as shown in FIG. 3B. Shielding 303 may also be annular and located on rotating member 320, as shown in FIG. 3A. Rotating member 320 also supports rotation orientation instrument 310. Further, as shown in FIG. 3A, neutron logging tool 300 also can have an orientation instrument 305 that is not on rotating member 320. In a variation of this embodiment, multiple sets of rotating detectors 301 may be placed along the length of the tool 300 in a manner similar to the proximal detector 104, the near detector 106, the far detector 110, and the long detector 112 of the tool 10 shown in FIG. 1A. In this manner, neutron logging tool 300 may have multiple rotating members 320, each with a gamma ray detector 301, spaced at increasing longitudinal distances from neutron source 302. In still another variation, one rotating member 320 may support multiple gamma ray detectors 301 at varying longitudinal distances from neutron source 302.

FIG. 3B additionally shows actuator 321, which causes the rotation of rotating member 320, and a power source 322 to power the actuator 321. Actuator 321 may be an electric motor, which would rotate rotating member 320 with a gear assembly. Actuator 322 may also be another type of motor, such as a hydraulic motor, which would utilize hydraulic pressure to rotate rotating member 320. As noted above, neutron logging tool 300 would have the components such as the instrumentation subsection and telemetry subsection, and further details are not provided here.

During operation of the neutron logging tool 300, the rotating member 320 causes the rotation of gamma ray detector 301. Shielding 303 can also be placed on the rotating member 320 such that the gamma ray detector 301 substantially detects gamma rays from the portion of the borehole 33 and formation 40 to which it is nearest. Two possible examples of general and/or localized shielding are seen in FIG. 2C, and these may be adapted to the embodiment shown in FIG. 3A. Accordingly, the gamma ray detector 301 is able to detect gamma rays from different portions of the formation 40 at different times during the rotation of the rotating member 320. For example, in FIG. 3A, the position of the gamma ray detector 301 allows it to detect gamma rays from a discrete azimuthal portion of the formation in the sensing direction $s_d$, as emphasized in FIG. 3A with dotted lines. This allows the detector 301 to obtain an azimuthal reading of the formation 40 as it rotates with rotating member 320.

Figure 5:
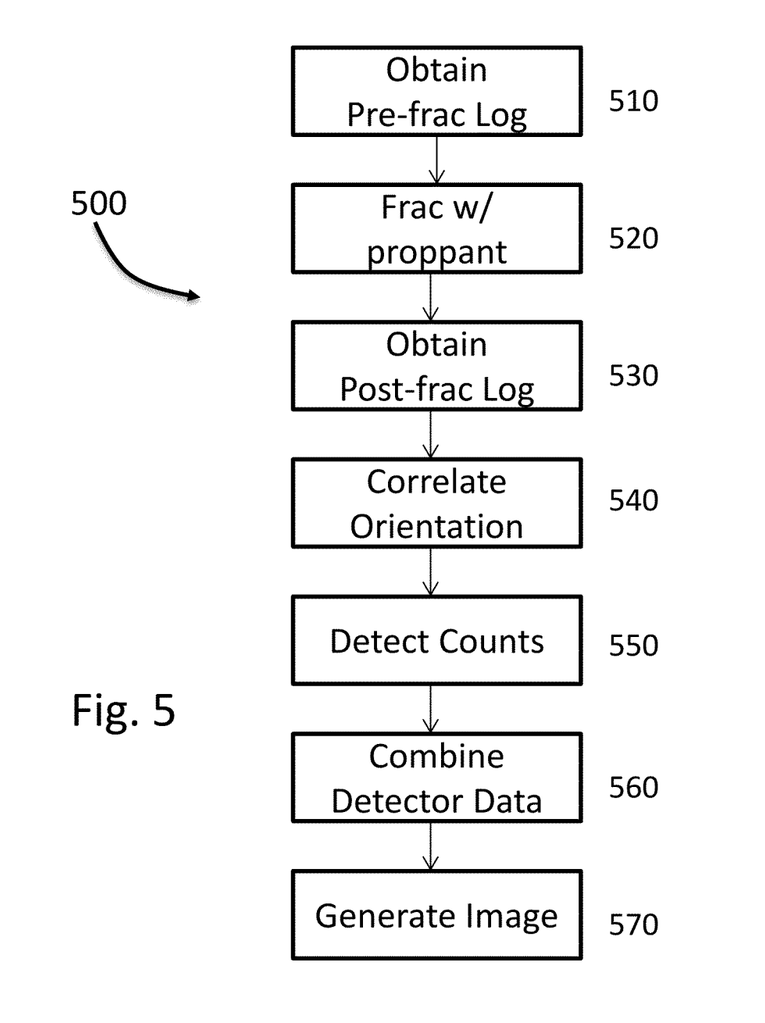
FIG. 5 shows a flow chart of a logging method according to the present disclosure.

Having an understanding of the neutron logging tool 200 and its various exemplary embodiments, discussion now turns to an example method 500 for obtaining azimuthal logs using the disclosed neutron logging tool 200 of a formation pre- and post-fracture, as shown in FIG. 5. Azimuthal logging data may be collected both before and after fracturing (steps 510, 520, and 530). The variance between the pre-fracture and post-fracture logs would indicate the presence of a doped proppant, as described below.

Figure 6:
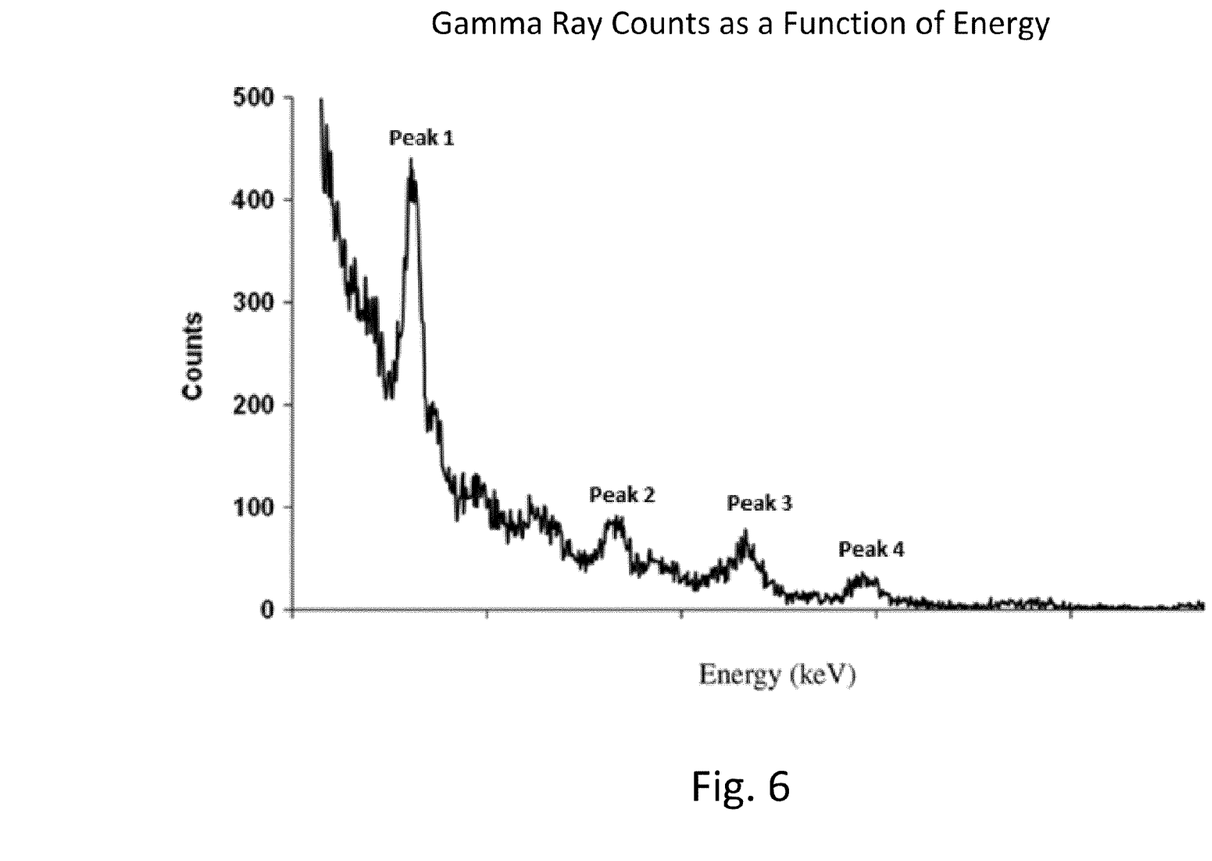
FIG. 6 shows a graph describing gamma ray counts as a function of energy.

In particular, the initial baseline pre-fracture log (step 510) may be completed in multiple ways. If the borehole 33 has already been drilled, the neutron logging tool 200 may be used to take the baseline log. To capture a log with the neutron logging system, the neutron source 202 in the neutron logging tool 200 sends high energy neutrons into the surrounding formation. The neutrons quickly lose energy as the result of scattering, after which they are absorbed by the various atoms within the ambient environment. The scattered and absorbed neutrons emit gamma rays with characteristic energies, as shown in FIG. 4B. These gamma ray emissions can be measured versus characteristic energy and the presence or absence of certain materials can be determined. An example graph showing the characteristic energies of different elements is shown in FIG. 6, where some identifiable energy peaks are labeled.

Because the disclosed tool 200 has multiple detectors 201a-d disposed around the circumference of the tool 200, the detectors 201a-d capture azimuthally directed logs of portions of the borehole 33. Thus, the resulting pre-fracture log data obtained would essentially include log data for each detector 201, with each detector's log data logging a portion of the formation 40 (i.e., a quadrant of the formation 40 if four detectors 201a-d are used).

If the borehole 33 is in the process of being drilled, logging while drilling (LWD) instruments may be used to capture log information for a baseline log. Such a LWD instrument may be a different tool than the disclosed tool 200, so that some additional correlation may be needed to match the pre-fracture log obtained with the LWD tool to the post-fracture log obtained with the disclosed tool 200 (described below in step 540). Correlating a pre-fracture log with a post fracture log may be done by finding an orientation reference point by performing a pattern-matching technique between the two logs. In this manner, although the pre-fracture and post-fracture logs would have been obtained by separate instruments, the logs would still be able to be analyzed and compared with respect to each other.

In step 520, the borehole 33 within the formation 40 would be fractured with a proppant. As known in the art, wells are fractured with a fracturing fluid to treat the formation 40 and improve oil and gas production. In a standard fracturing operation, fracturing fluid is pumped down the wellbore with high pressure, causing the formation 40 to fracture around the borehole 33.

The next stage of the fracture operation contains proppant (e.g. sand and/or other particles), which remains in the formation fractures and acts to "prop" open the fractures in the formation to increase hydrocarbon flow into the borehole 33. The proppant used in the disclosed fracturing process is preferably doped with neutron-absorbing materials, such as gadolinium. Other neutron-absorbing materials may include boron, strontium, barium, gallium, manganese, tantalum, germanium, cadmium, iridium, or combinations thereof. A particular example of a doped proppant and its usage is shown in U.S. Patent Application Publication No. 2011/0177984.

Figure 4A:
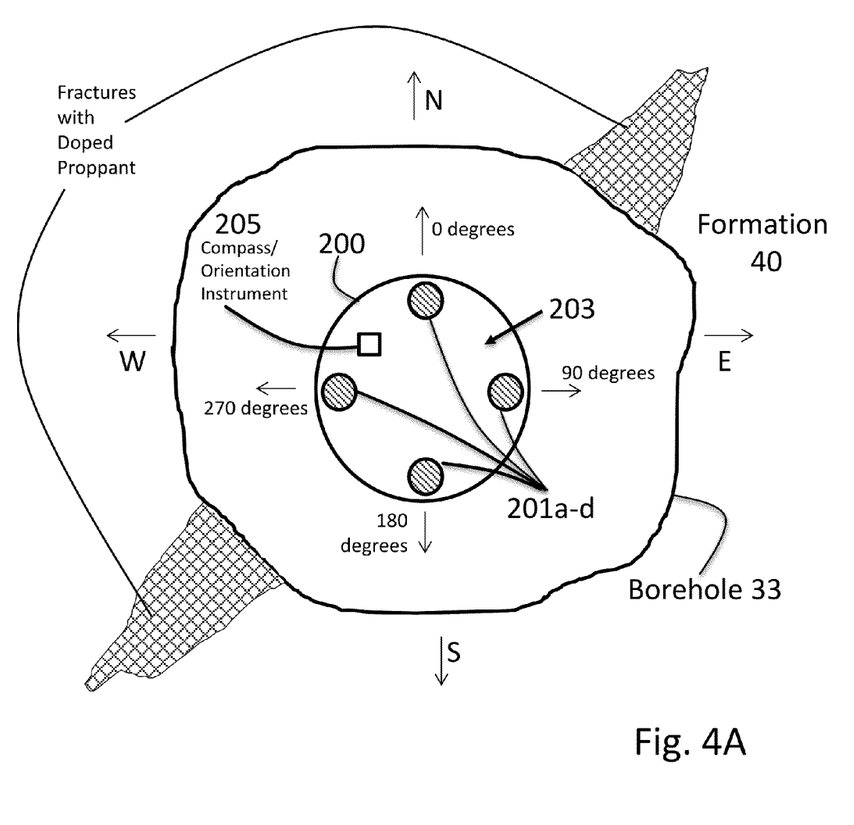
FIG. 4A shows a top-down view of an example neutron logging tool within a borehole.
Figure 4B:
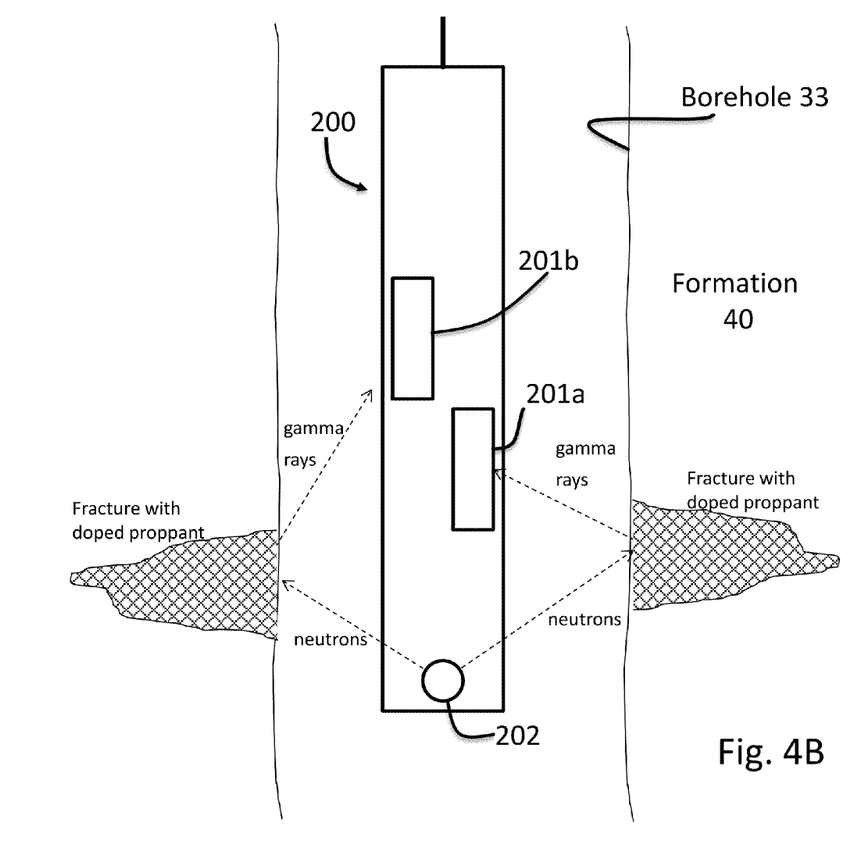
FIG. 4B shows a side view of the example neutron logging tool within the borehole.

As shown in FIGS. 4A-4B, the gadolinium or other material present in the doped proppant would similarly absorb neutrons that were emitted from the neutron source 202 within the neutron logging tool 200 during post-fracture logging. Upon absorbing a neutron from the neutron source 202, the gadolinium or other material will become an isotope of the element. In many cases, the isotope will subsequently release gamma rays with the characteristic energies of the isotope, which can be detected and analyzed by the gamma ray detectors 201a-d of the disclosed tool 200. As mentioned above, the characteristic energies of the gamma ray emissions can be used to identify the presence or absence of these materials.

Returning to the method of FIG. 5, the pre-fracture log (step 510) can be compared with the post-fracture log (step 530) to determine the effectiveness of the fracturing operation and other details consistent with the present disclosure. Unfortunately, the neutron logging tool 200 in wireline operations may rotate while it is lowered into the borehole 33 during the separate logs. Typically, in a prior art logging tool (i.e., 10 in FIGS. 1A-1B) without azimuthal log capabilities, the rotation of the neutron logging tool 10 would not affect the resultant log. However, the neutron logging tool's 200 rotation, whether inadvertent or intentional, should be compensated for to produce a more accurate azimuthal log.

Accordingly, orientation of the tool 200 during the pre-fracture and post-fracture logs needs to be correlated (Step 540). To assist in compensating for rotation, the neutron logging tool 200 may have an orientation instrument 205 (as shown in FIG. 4A), such as electronic compass, magnetometer, inclinometer, etc., that calculates and stores orientation data. The orientation instrument 205 may also be a mechanical device, such as a weighting device or magnetic decentralizer that is used to ensure a particular orientation of the gamma ray detectors 201a-d. The placement of the instrument 205 in FIG. 4A is only meant to be illustrative; the actual placement of the instrument 205 may be elsewhere in the tool 200.

Software navigation packs could additionally calculate the orientation of the neutron logging tool 200 as it passes downhole. The detector-specific logging data could then be correlated and combined with the orientation data of the neutron logging tool 200 for a given data reading, as shown in step 540 in FIG. 5. These detector-specific data sets could then be combined to give azimuthal log information.

For example, the neutron logging tool 200 shown in FIG. 4A may have been lowered downhole via wireline with the gamma ray detector 201a (at 0 degrees) pointing north. If neutron logging tool 200 rotated such that gamma ray detector 201a (at 0 degrees) pointed east, the resulting data gathered from the gamma ray detector 201a-d would no longer be restricted to a single direction. However, the orientation instrument's 205 data could be correlated with the gamma ray detector's 201a-d data, allowing for an azimuthal log of borehole 33 that accounts for changes in the tool's 200 orientation (i.e., rotation) in the borehole 33.

A similar procedure may be used to correlate orientation data for neutron logging tool 300 of FIG. 3A. Rotating member 320 on neutron logging tool 300 may have a rotation orientation instrument 310, which may be used to determine the position of the detector 301 as it rotates along with rotating member 320. Additionally, orientation instrument 305 may be on the non-rotating portion of the neutron logging tool 300. The orientation instrument's 305 data could be correlated with the rotation orientation instrument's 310 data, allowing for an azimuthal log of borehole 33 that accounts for changes in the tool's 300 orientation (i.e., from the rotation of the tool 300) and also accounts for the detector's 301 orientation (i.e., from the rotation of the detector 301 within the tool 300) in borehole 33.

With this data, the azimuthal log readings which incorporate a direction or orientation variable allow an operator to obtain a more accurate understanding of the acquired log data. Azimuthal log data may be obtained even in the case of having a horizontal borehole. Orientation instruments 205 are available for horizontal borehole logging as well. The data from this instrument 205 could be similarly combined with the detector log readings from the multiple detectors 201a-d as described above to create an azimuthal log of the formation.

Although navigation pack tools are also available within logging while drilling (LWD) systems, the pre-fracture log obtained by an LWD tool may not directly compare to the post-fracture log obtained by the neutron logging tool 200 with multiple detectors 201a-d. This is primarily because there are response differences in wireline and LWD instruments, and thus the pre- and post-fracture logs. As a result, logs taken by different instruments cannot necessarily be directly compared without additional calibration or compensation. Thus, any different response characteristics of the LWD tool and neutron logging tool 200 in the disclosed method of FIG. 5 can be accounted and compensated for in order to compare logs from the different tools.

Continuing with the method in FIG. 5, now that pre-fracture and post-fracture log data have been correlated for orientation, the method can analyze the log data by counting gamma rays with respect to time, energy, total counts, and subsurface depth (or borehole distance, for example, in horizontal boreholes), (step 550), combining data from the multiple detectors 201a-d (step 560) (including orientation data), and generating a comprehensive image (step 570). As noted above, when gamma ray detectors are at different longitudinal distances from the neutron source, as shown in FIG. 2B, a correction for the different distances would have to be made when combining data at step 560. Time data provides information regarding formation sigma, and consequently proppant distribution. Gamma ray energy data, as well as total gamma ray counts, can also provide information regarding proppant distribution.

By way of a brief example, FIG. 6 displays gamma ray counts along an energy spectrum, which could be obtained by one of the detectors 201a-d of the disclosed tool 200. If a gadolinium-doped proppant is used for formation fracturing, the characteristic energy of gamma rays emitted from gadolinium could be read along the energy spectrum to detect the gadolinium's presence or absence. Gamma ray spikes for the characteristic energy for gadolinium could indicate the presence of a formation fracture with doped proppant. Variances in gamma ray counts between detectors 201a-d would indicate that the proppant was not evenly distributed within a fractured area.

It will be appreciated that total counts of gamma rays may also be measured, without the need to separate the gamma rays along the energy spectrum. For example, if a baseline pre-fracture log has been taken of total gamma ray counts, then any significant variance in a post-fracture log from the pre-fracture log would also indicate the presence of a doped proppant. Total gamma ray counts could be analyzed with respect to time, subsurface depth, and azimuthal orientation, for example. It is understood that the total counts of gamma rays would have to be properly calibrated and/or normalized for the purposes of comparison among the detectors.

Figure 7:
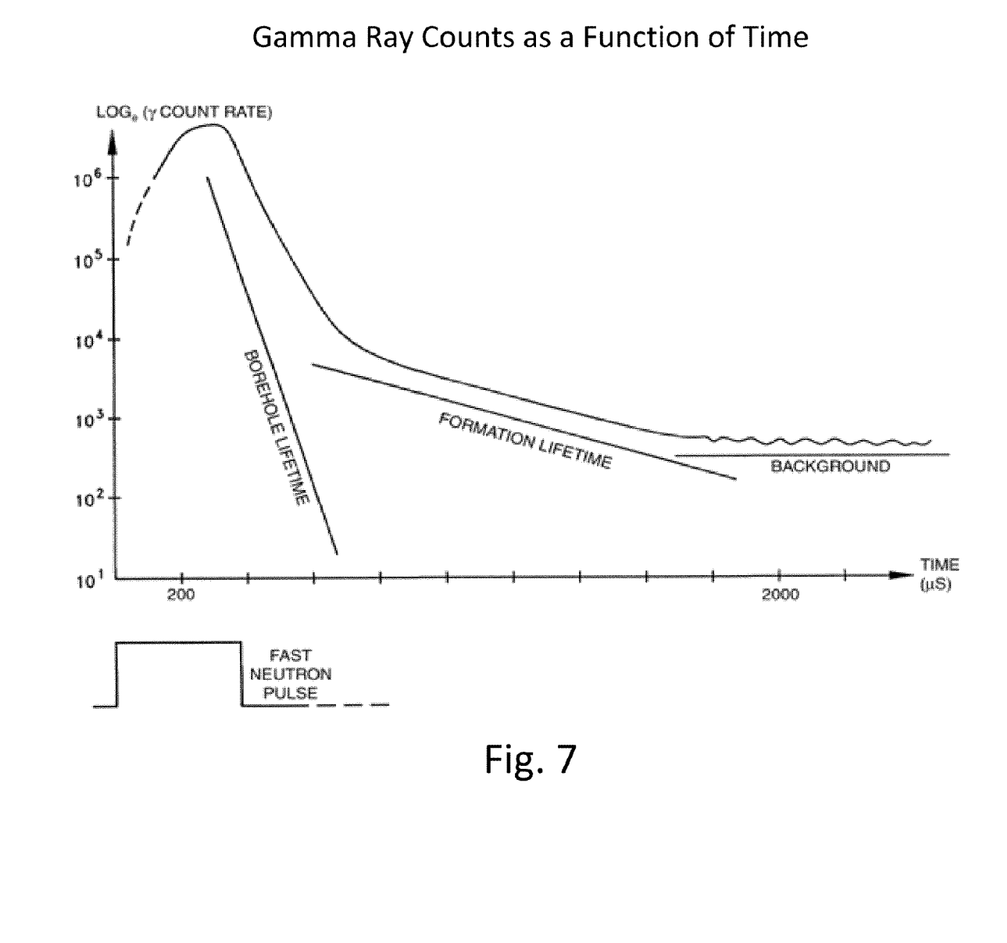
FIG. 7 shows a graph describing gamma ray counts as a function of time.

As another brief example in FIG. 7, gamma ray counts may be measured as a function of time. A fast neutron pulse sent from the tool's neutron source 202 would generate resultant gamma rays emissions that would have to be timely detected by a detector 201. The slope of the logarithmic gamma ray counts versus time can be used as an indicator to judge the sigma value of the formation 40. Additionally, when a doped proppant used in fracturing the formation 40 as used herein, the sigma of the various detectors' formation 40 slopes can be measured. This would also allow for the detectors' 201a-d gamma ray counts to be used to determine the effectiveness of the fracture of the formation 40.

Figure 8:
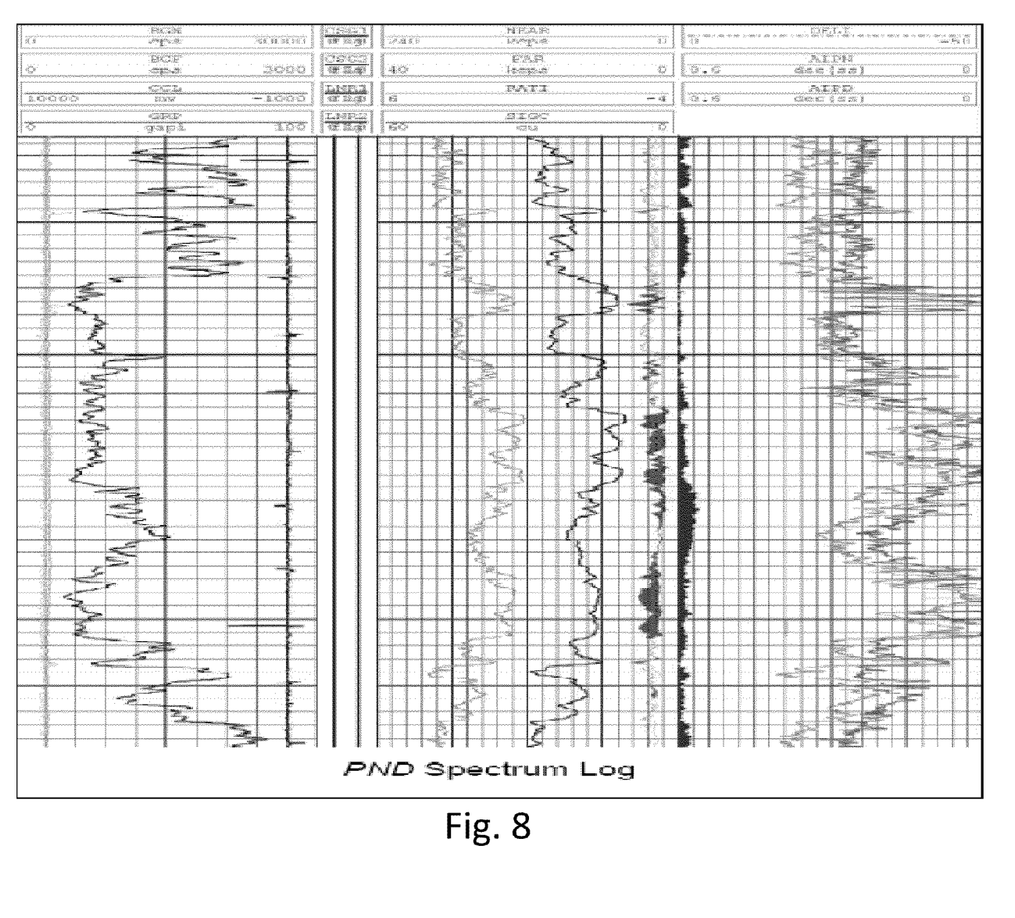
FIG. 8 shows a pulse neutron detector spectrum log as a function of depth.

Finally, in another brief example, FIG. 8 displays a count of gamma rays versus depth down the borehole 33 for one detector 201. Each detector 201a-d would generate its own set of data similar to FIG. 8, and each data set would represent gamma ray counts versus depth at the particular orientation of the detector 201a-d in the borehole 33. Each detector's data set may be displayed separately. In addition, another data set could display the sum of all or a subset of detectors' 201a-d data sets. When the individual detector data sets are combined with each other and with an orientation calculated from the navigation pack tool, a log containing full azimuthal data can be generated.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A neutron logging tool for obtaining an azimuthal log of a borehole, the tool comprising:
   a housing deploying in the borehole and having a neutron source;
   an orientation instrument disposed on the housing and determining orientation data of the housing in the borehole;

a plurality of gamma ray detectors disposed about a circumference of the housing and displaced at longitudinally different distances from the neutron source, the gamma ray detectors adapted to detect gamma ray data as individual logs from portions of a formation surrounding the borehole; and a shielding at least partially shielding each of the gamma ray detectors and at least partially focusing the sensing by each of the gamma ray detectors towards a sensing direction away from the housing, wherein the individual logs from the detected gamma ray data of the gamma ray detectors are combined with different weightings into the azimuthal log of the borehole.

2. The neutron logging tool of claim 1, wherein each of the gamma ray detectors is radially equidistantly displaced from a central axis of the neutron logging tool.

3. The neutron logging tool of claim 2, wherein each of the gamma ray detectors does not intersect the central axis of the neutron logging tool.

4. The neutron logging tool of claim 2, wherein one or more of the gamma ray detectors intersects the central axis of the neutron logging tool.

5. The neutron logging tool of claim 2, wherein the gamma ray data of each of the gamma ray detectors is weighted equally based on the radial equidistance.

6. The neutron logging tool of claim 1, wherein each of the gamma ray detectors is not radially equidistantly displaced from a central axis of the neutron logging tool.

7. The neutron logging tool of claim 6, wherein the gamma ray data of each of the gamma ray detectors is weighted differently based on the radial displacement.

8. The neutron logging tool of claim 1, wherein the shielding substantially surrounds the plurality of gamma ray detectors.

9. The neutron logging tool of claim 8, wherein the shielding is localized around each of the gamma ray detectors.

10. The neutron logging tool of claim 1, wherein the orientation instrument is a mechanical device.

11. The neutron logging tool of claim 1, wherein the orientation instrument is a weighting device.

12. A neutron logging tool for obtaining an azimuthal log of a borehole, the tool comprising:

a housing deploying in the borehole and having a neutron source;

a rotating member disposed on the housing and rotating about a positional axis of the housing;

a plurality of gamma ray detectors disposed on the rotating member and displaced at different longitudinal distances from the neutron source, the gamma ray detectors adapted to detect gamma rays as individual logs from portions of a formation surrounding the borehole;

a shielding at least partially shielding the at least one gamma ray detector and at least partially focusing the sensing by the at least one gamma ray detector towards a sensing direction away from the housing; and an orientation instrument disposed on the housing and determining first orientation data of the housing in the borehole, wherein the individual logs from the detected gamma ray data the gamma ray detectors are combined with different weightings into the azimuthal log of the borehole.

13. The neutron logging tool of 12, wherein the rotating member further comprises a rotation orientation instrument determining second orientation data of the rotating member in the borehole.

14. The neutron logging tool of 12, wherein the shielding substantially surrounds the gamma ray detectors.

15. The neutron logging tool of 12, wherein the gamma ray detectors are disposed about a circumference of the rotating member.

16. The neutron logging tool of 12, wherein the shielding is located on the rotating member.

17. The neutron logging tool of 12, wherein the sensing direction of the gamma ray detectors rotate with the rotating member, and wherein the gamma ray detectors detect the gamma ray data in the sensing direction from a given portion of the formation at a given time.

18. The neutron logging tool of claim 12, wherein the tool detects the gamma ray data in a post-fracture log of the formation surrounding the borehole after fracturing of the borehole with a doped proppant.

19. The neutron logging tool of claim 18, wherein the tool initially detects pre-fracture gamma ray data in a pre-fracture log of the formation surrounding the borehole before fracturing of the borehole with the doped proppant.

20. A method of neutron logging a borehole in a formation, the method comprising:

fracturing the borehole with a doped proppant;

deploying in the borehole a neutron logging tool having a neutron source and a plurality of sensors, each of the sensors being arranged to detect gamma ray data from one of a plurality of discrete azimuthal directions in the borehole and being displaced at different longitudinal distances from the neutron source;

detecting gamma ray data in a post-fracture log of the formation surrounding the borehole by obtaining individual logs from the gamma ray data of each of the sensors; and generating a representation of the formation surrounding the borehole from the post-fracture log by combining the individual logs into the post-fracture log and weighting the gamma ray data of each of the sensors differently.

21. The method of claim 20, wherein fracturing the borehole with the doped proppant comprises doping proppant with an activatable material having a characteristic energy; and wherein detecting the gamma ray data in the post-fracture log of the formation comprises detecting gamma ray counts at the characteristic energy originating from the activatable material being activated from a neutron source of the neutron logging tool.

22. The method of claim 20, further comprising assessing the fracture of the formation by determining a distribution of the doped proppant from the representation.

23. The method of claim 20, further comprising:
initially obtaining a pre-fracture log with the neutron logging tool,
wherein generating the representation comprises comparing the pre-fracture log with the post-fracture log.

24. The method of claim 20, further comprising:
initially obtaining a pre-fracture log with a logging while drilling tool,
wherein generating the representation comprises comparing the pre-fracture log with the post-fracture log.

25. The method of claim 20, wherein detecting the gamma ray data comprises obtaining orientation data of the neutron logging tool in the borehole; and wherein generating the representation comprises correlating the gamma ray data with the orientation data.

26. The method of claim 20, wherein at least one of the sensors rotates about the neutron logging tool, the at least one sensor arranged to detect the gamma ray data from the discrete azimuthal directions over time.

27. The method of claim 26, further comprising:
   determining rotation orientation data of the at least one rotating sensor; and
   determining borehole orientation of the neutron logging tool to the borehole,
   wherein generating the representation comprises correlating rotation orientation data with borehole orientation data.

28. The method of claim 20, wherein generating the representation comprises compensating for whether the neutron logging tool was run decentralized to the borehole.

29. The method of claim 20, wherein obtaining the post-fracture log comprises counting gamma rays with respect to one of time, energy, total counts, and borehole depth.

30. The method of claim 20, wherein the sensors are radially equidistantly displaced from a central axis of the neutron logging tool; and wherein combining the individual logs into the post-fracture log comprises weighting the gamma ray data of the sensors equally relative to the central axis.

31. The method of claim 20, wherein the sensors are not radially equidistantly displaced from a central axis of the neutron logging tool; and wherein combining the individual logs into the post-fracture log comprises weighting the gamma ray data of the sensors differently with respect to the central axis.

32. The method of claim 20, wherein detecting the gamma ray data comprises detecting the gamma ray data from a plurality of the one or more sensors disposed about a circumference of the neutron logging tool and being spaced apart from one another with spaces between the sensors.

33. The method of claim 32, wherein detecting the gamma ray data comprises at least partially focusing the detection by each of the sensors towards a sensing direction away from the neutron logging tool by shielding each of the sensors with shielding interposed in the spaces between the sensors.

* * * * *